United States Patent
Helm

(10) Patent No.: US 10,448,180 B1
(45) Date of Patent: Oct. 15, 2019

(54) SYSTEMS AND METHODS FOR VEHICLE EXTERNAL AUDIO VOLUME INDICATION AND CONTROL OF THE SAME

(71) Applicant: Toyota Motor Engineering & Manufacturing North America, Inc., Plano, TX (US)

(72) Inventor: Sean L. Helm, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/177,538

(22) Filed: Nov. 1, 2018

(51) Int. Cl.
| | |
|---|---|
| *H04R 29/00* | (2006.01) |
| *B60K 35/00* | (2006.01) |
| *B60R 11/02* | (2006.01) |
| *H04R 5/02* | (2006.01) |

(52) U.S. Cl.
CPC ........... *H04R 29/008* (2013.01); *B60K 35/00* (2013.01); *B60R 11/0217* (2013.01); *B60R 11/0247* (2013.01); *H04R 5/02* (2013.01); *B60K 2370/15* (2019.05); *B60K 2370/16* (2019.05); *H04R 2499/13* (2013.01)

(58) Field of Classification Search
CPC .... H04R 2499/13; H04R 5/02; H04R 29/008; B60R 11/0217; B60R 11/0247; B60K 35/00; B60K 2370/15; B60K 2370/16
USPC .......................................................... 381/86
See application file for complete search history.

(56) References Cited

U.S. PATENT DOCUMENTS

| | | | |
|---|---|---|---|
| 4,476,571 A | * | 10/1984 | Tokumo ................... H03G 3/32 381/107 |
| 7,339,462 B1 | | 3/2008 | Diorio |
| 2011/0274307 A1 | | 11/2011 | Lynch |

FOREIGN PATENT DOCUMENTS

| | | |
|---|---|---|
| KR | 20000026075 A | 5/2000 |
| WO | 2013098983 A1 | 7/2013 |

OTHER PUBLICATIONS

"Arkamys Audio Solutions"; Accessed Aug. 29, 2018; URL: https://www.arkamys.com/automotive-audio/solutions-automotive/3d-sound-alerts/.

* cited by examiner

*Primary Examiner* — Paul Kim
(74) *Attorney, Agent, or Firm* — Dinsmore & Shohl LLP

(57) ABSTRACT

An external audio range indication system, for a vehicle, includes an audio system, a display device, and an electronic control unit. The audio system includes a plurality of speakers. The plurality of speakers is configured to output an audio content. The electronic control unit is operatively connected to the audio system and the display device. The electronic control unit includes a processor and a memory unit coupled to the processor. The memory unit stores logic that, when executed by the processor, causes the electronic control unit to determine an external audio range of the audio content output from the plurality of speakers, the external audio range being a range from the vehicle at which the audio content output from the plurality of speakers is audible by parties external to the vehicle, and control the display device to display the external audio range.

20 Claims, 8 Drawing Sheets

SYSTEMS AND METHODS FOR VEHICLE EXTERNAL AUDIO VOLUME INDICATION AND CONTROL OF THE SAME

TECHNICAL FIELD

The present specification generally relates to systems and methods for external audio range indication for a vehicle and, more specifically, to systems and methods for displaying an external audio range.

BACKGROUND

Vehicles are generally equipped with audio systems. These audio systems generally have a display within an instrument panel and a plurality of speakers dispersed with a cabin of the vehicle. Generally, a vehicle occupant, such as a driver of the vehicle, may use the display to adjust a volume and to choose a radio station, an auxiliary input, a Bluetooth connection with a mobile electronic device, and/or the like. As such, the vehicle occupant generally controls the audio level and the type of audio being played. However, the audio sounds generated from within the cabin of the vehicle often project outside of the vehicle, especially when the vehicle is stopped or moving at slow speeds. As such, vehicle occupants may not want others outside of the vehicle to hear the vehicle's audio system.

Accordingly, a need exists for systems and methods for displaying an external audio range of the vehicle's audio system.

SUMMARY

In one embodiment, an external audio range indication system for a vehicle is provided. The vehicle includes a passenger compartment, an audio system, a display device, and an electronic control unit. The audio system includes a plurality of speakers within the passenger compartment. The plurality of speakers is configured to output an audio content. The electronic control unit is operatively connected to the audio system and the display device. The electronic control unit includes a processor and a memory unit coupled to the processor. The memory unit stores logic that, when executed by the processor, causes the electronic control unit to determine an external audio range of the audio content output from the plurality of speakers, the external audio range being a range from the vehicle at which the audio content output from the plurality of speakers is audible by parties external to the vehicle, and control the display device to display the external audio range.

In another embodiment, a method of displaying an external audio range indication for a vehicle including a passenger compartment is provided. The method includes the step of outputting, from an audio system having a plurality of speakers disposed in the passenger compartment, an audio content. An electronic control unit determines an external audio range of the audio content output from the plurality of speakers. The external audio range is a range from the vehicle at which the audio content output from the plurality of speakers is audible by parties external to the vehicle. A display device displays the external audio range indication for the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally directed to an external audio range indication system for a vehicle that has a passenger compartment. The external audio range indication system includes an audio system, a display device, and an electronic control unit. The audio system includes a plurality of speakers configured to output an audio content that has an external audio range, the external audio range is a range from the vehicle at which the audio content output from the plurality of speakers is audible by parties external to the vehicle. The display device is configured to provide a visual indication, to a vehicle occupant, of the external audio range such that as the external audio range varies, the visual indication displayed also changes.

The phrase "communicatively coupled" is used herein to describe the interconnectivity of various components of the external audio range indication system for reducing an external audio range of a vehicle's audio system and visually displaying the non-reduced and reduced external audio ranges and means that the components are connected either through wires, optical fibers, or wirelessly such that electrical, optical, and/or electromagnetic signals may be exchanged between the components. It should be understood that other means of connecting the various components of the system not specifically described herein are included without departing from the scope of the present disclosure.

Figure 1:
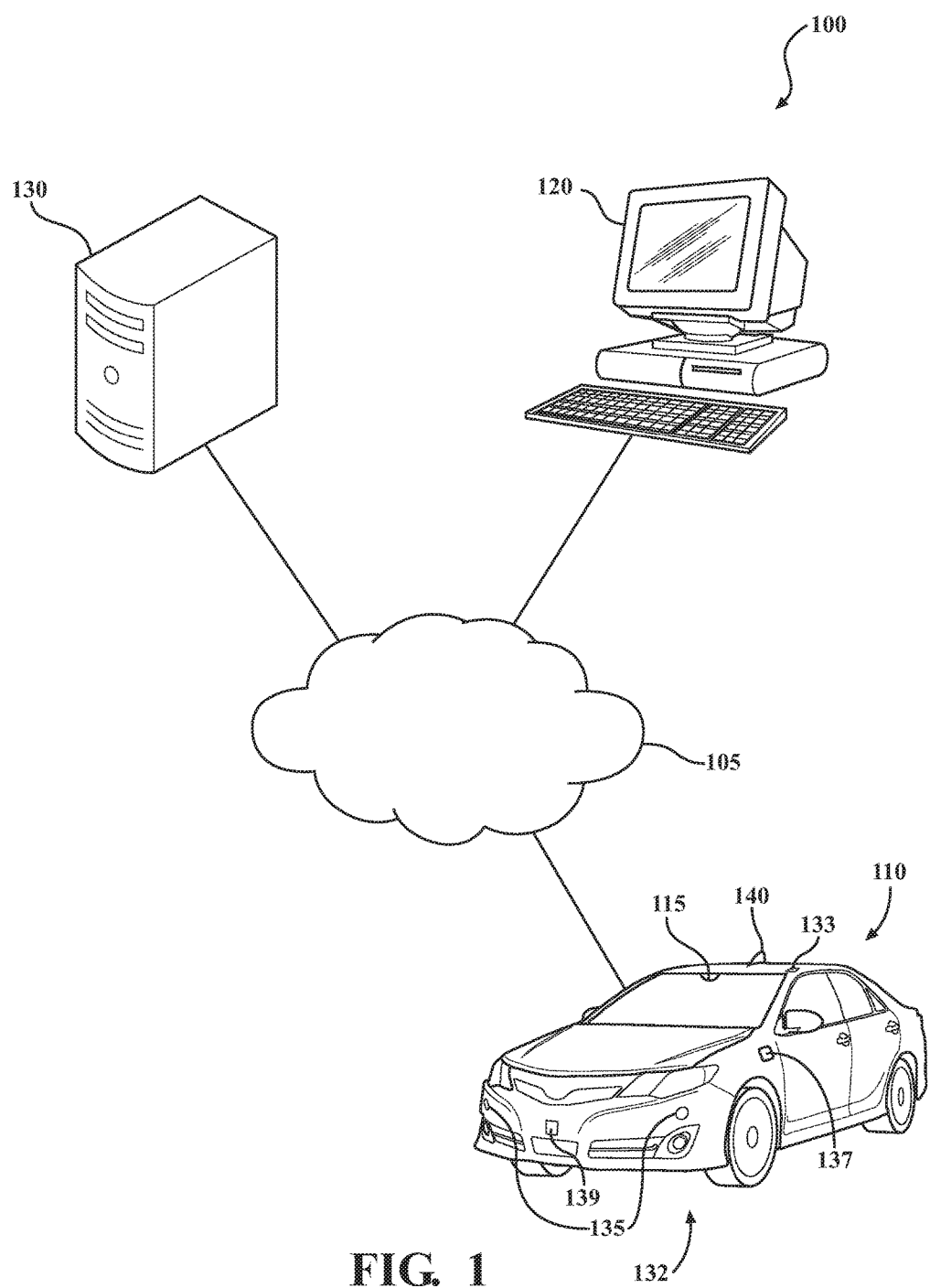
FIG. 1 schematically depicts an illustrative network having components for an external audio range indication system according to one or more embodiments shown or described herein.

Referring now to the drawings, FIG. 1 depicts an illustrative network having components for an external audio range indication system 100 according to embodiments shown and described herein. As illustrated in FIG. 1, a computer network 105 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 105 may generally be configured to electronically connect one or more devices such as computing devices and/or components thereof. Illustrative devices may include, but are not limited to, a vehicle 110, a user computing device 120, and a server computing device 130.

The vehicle 110 may generally be any vehicle with and audio system and one or more onboard computing devices, particularly computing devices that contain hardware for processing data, storing data, displaying data, and detecting objects such as other vehicles or pedestrians near or around the vehicle 110. Thus, the vehicle 110 and/or components thereof may perform one or more computing functions, such as receiving inputs from a vehicle occupant, storing the input, determining an external audio range of the vehicle's audio system 145 (FIG. 2), determine a current vehicle speed, determining whether an object is near or around the vehicle 110 and/or within the external audio range of the vehicle's audio system 145 (FIG. 2), and/or the like. Further, the vehicle 110 and/or components thereof may perform one or more computing functions, such as controlling a display device 220 (FIG. 3A) to display the external audio range and processing the object detection, the vehicle speed, and the external audio range of the vehicle's audio system 145 (FIG. 2), as described in greater detail herein.

The vehicle 110 may generally include a sensing system 132. The sensing system 132 may include at least one sensor 135 configured for external sensing, an antenna 140, a microphone 137, an image-capturing device 115, a global positioning systems (GPS) device 133, a vehicle sensor 139 configured to detect a plurality of current vehicle conditions, and/or the like.

The user-computing device 120 may generally be used as an interface between a user and the other components connected to the computer network 105. Thus, the user-computing device 120 may be used to perform one or more user-interfacing functions, such as receiving one or more inputs from a user or providing information to the user, as described in greater detail herein. Accordingly, the user-computing device 120 may include at least a display and/or input hardware, as described in greater detail herein. In the event that the server-computing device 130 requires oversight, updating, and/or correction, the user computing device 120 may be configured to provide the desired oversight, updating, and/or correction. The user-computing device 120 may also be used to input additional data into a corpus of data stored on the server-computing device 130. For example, the user computing device 120 may contain software programming or the like that relates to viewing, calibrating, and/or software programming the external audio range of the vehicle's audio.

The server-computing device 130 may receive data from one or more sources, generate data, store data, index data, search data, and/or provide data to the user-computing device 120 and/or the vehicle 110 (or components thereof). In some embodiments, the server-computing device 130 may employ one or more algorithms that are used for the purposes of calibrating and analyzing data related to the external audio range of the vehicle 110, such as a different external audio range based on different types of vehicles, as described in greater detail herein. Moreover, the server-computing device 130 may be used to produce data, such as establishing thresholds for the external audio range of the vehicle's audio, as described in greater detail herein. It should be appreciated that the vehicle on board computing systems may function with the server-computing device such that the vehicle on board computing systems may perform the calibration in real time using an external microphone, as discussed in greater detail herein.

It should be understood that while the user-computing device 120 is depicted as a personal computer and the server-computing device 130 is depicted as a server, these are non-limiting examples. In some embodiments, any type of computing device (e.g., mobile computing device, personal computer, server, etc.) may be used for any of these components. Additionally, while each of these computing devices is illustrated in FIG. 1 as a single piece of hardware, this is also merely an example. Each of the user-computing device 120 and the server-computing device 130 may represent a plurality of computers, servers, databases, components, and/or the like.

Figure 2:
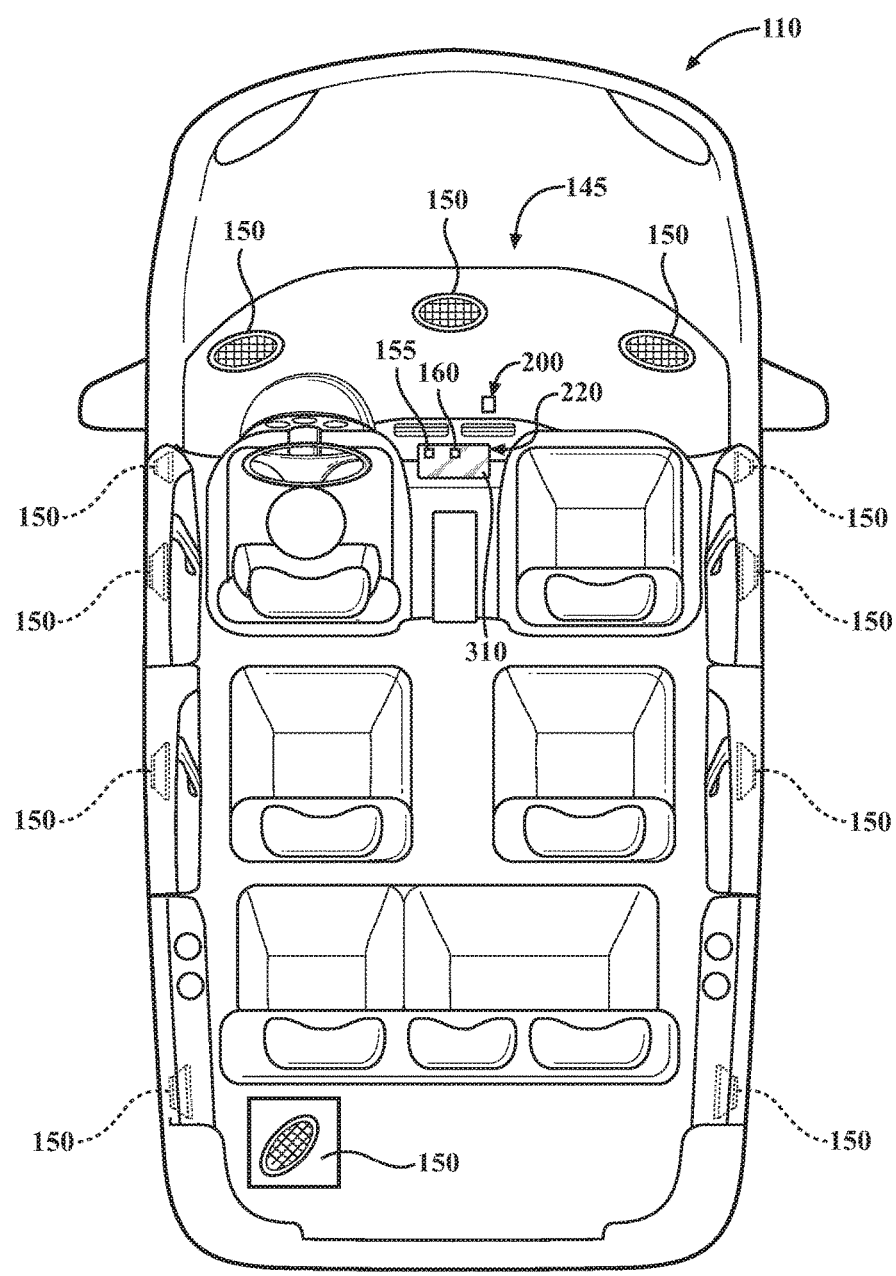
FIG. 2 schematically depicts a top down view of the vehicle of FIG. 1 illustrating a vehicle including the external audio range system according to one or more embodiments shown and described herein.

FIG. 2 schematically depicts a top down view of the vehicle illustrating the external audio range indication system 100. The external audio range indication system 100 includes an audio system 145, a display device 220, and an electronic control unit 200. The audio system 145 is mounted within the vehicle 110 and includes a plurality of speakers 150. The display device 220 includes a display portion 310, as discussed in further detail herein. The display device 220 may contain or be a digital signal processor 155 having an amplifier (not shown) that is electrically coupled or communicatively coupled to the electronic control unit 200 (FIG. 3A) and the audio system 145 so to process an electrical signal and transmit the signals to a plurality of speakers 150 shown mounted at various locations of the vehicle 110. Each signal to a respective speaker 150 is configured to provide a predetermined audio output wherein the collective audio output of a respective speaker 150 is an audio content. It should be appreciated that the audio content may be anything audible output by the plurality of speakers 150 such as a Bluetooth hands-free conservation, music generated from the audio system 1145, and/or the like. In some embodiments, the audio system 145 further includes an equalizer 160 commutatively coupled to the digital signal processor 155, the electronic control unit 200 (FIG. 3A) and/or the display device 220. Thus, the electrical signal to a speaker 150 such as a tweeter may not necessarily be the same as an electrical signal transmitted to a subwoofer or a woofer. As such, the audio content may further include an audio characteristic, as discussed in greater detail herein.

Figure 3A:
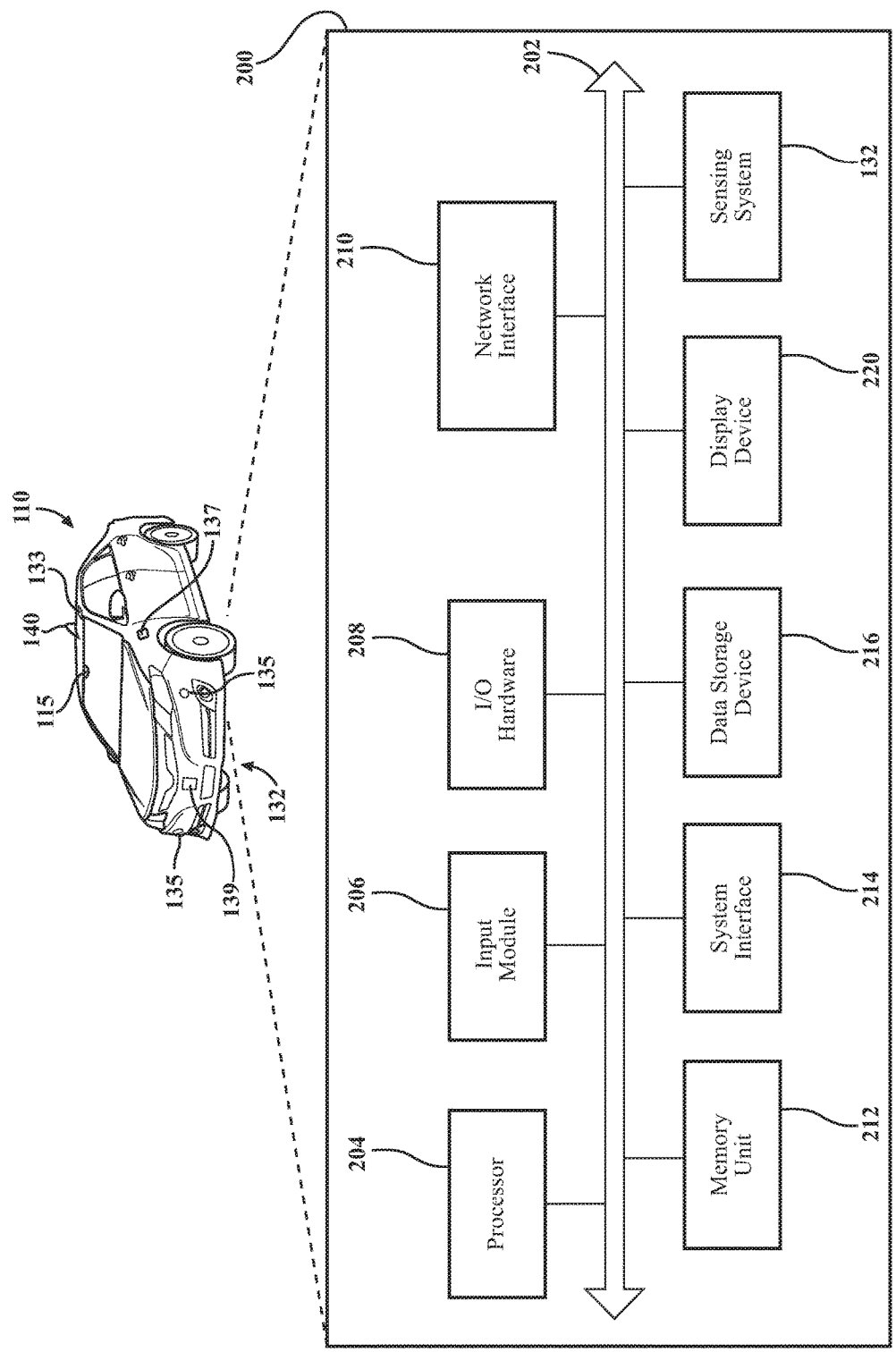
FIG. 3A schematically depicts illustrative hardware components of an electronic control unit that may be used in the external audio range indication system according to one or more embodiments shown and described herein.

FIG. 3A schematically depicts illustrative hardware components of the vehicle 110 that may be used in the external audio range indication system 100. While the components depicted in FIG. 3A are described with respect to the vehicle 110, it should be understood that similar components may also be used for the user-computing device 120 (FIG. 1) and/or the server-computing device 130 (FIG. 1) without departing from the scope of the present disclosure.

The vehicle 110 may include the electronic control unit 200 having a non-transitory computer-readable medium for completing the various processes described herein, embodied as hardware, software, and/or firmware, according to embodiments shown and described herein. While in some embodiments the electronic control unit 200 may be configured as a general purpose computer with the requisite hardware, software, and/or firmware, in other embodiments, the electronic control unit 200 may also be configured as a special purpose computer designed specifically for performing the functionality described herein. For example, the electronic control unit 200 may be a device that is particularly adapted to automatically adjust the volume of the audio system 145 so to control the external audio range and control the display device 220 to display the external audio range. In another example, the electronic control unit 200 may be a device that is particularly adapted to utilize the sensing system 132 of the vehicle 110 for the purposes of monitoring the vehicle conditions, monitoring for objects near or around the vehicle 110 such as other vehicles and/or pedestrians, and execute commands to the audio system 145. In embodiments where the electronic control unit 200 is a general purpose computer, the systems and methods described herein provide a mechanism for improving functionality by providing a visual display of the display of the external audio range, which is a limited data set and an improvement in the visual display to a vehicle occupant.

Still referring to FIG. 3A, the electronic control unit 200 may generally be an onboard vehicle computing system. In some embodiments, the electronic control unit 200 may be a plurality of vehicle computing systems.

As also illustrated in FIG. 3A, the electronic control unit 200 may include a processor 204, an input module 206, an I/O hardware 208, a network interface hardware 210, a non-transitory memory unit 212, a system interface 214, a data storage device 216, the display device 220, and the sensing system 132. A local interface 202, such as a bus or the like, may interconnect the various components.

The processor 204, such as a computer processing unit (CPU), may be the central processing unit of the electronic control unit 200, performing calculations and logic operations to execute a program. The processor 204, alone or in conjunction with the other components, is an illustrative processing device, computing device, or combination thereof. The processor 204 may include any processing component configured to receive and execute instructions (such as from the data storage device 216 and/or the memory unit 212).

The memory unit 212 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory unit 212 may include one or more programming instructions thereon that, when executed by the processor 204, cause the processor 204 to complete various processes, such as the processes described herein with respect to FIG. 5. Still referring to FIG. 3A, the programming instructions stored on the memory unit 212 may be embodied as a plurality of software logic modules, where each logic module provides programming instructions for completing one or more tasks, as described in greater detail below with respect to FIG. 3B.

The network interface hardware 210 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 210 may provide a communications link between the vehicle 110 and the other components of the external audio range control system depicted in FIG. 1, including (but not limited to) the server-computing device 130.

Still referring to FIG. 3A, the data storage device 216, which may generally be a storage medium, may contain one or more data repositories for storing data that is received and/or generated. The data storage device 216 may be any physical storage medium, including, but not limited to, a hard disk drive (HDD), memory, removable storage, and/or the like. While the data storage device 216 is depicted as a local device, it should be understood that the data storage device 216 may be a remote storage device, such as, for example, a server-computing device or the like (e.g., the server-computing device 130 of FIG. 1). Illustrative data that may be contained within the data storage device 216 is described below with respect to FIG. 3C. It should be appreciated that the amount of available storage space in the data storage device 216 may be limited due to its location in the electronic control unit 200 in some embodiments. As such, it may be necessary to minimize the size of the data stored thereon, as described in greater detail herein.

Still referring to FIG. 3A, the input module 206 may include tactile input hardware (i.e. a joystick, a knob, a lever, a button, etc.) that allows the vehicle occupant to input settings such as current audio volume, threshold audio volume values for the external audio range indication system 100 (FIG. 1), sensitivity or a range for the components of the sensing system 132 (i.e. the at least one sensor 135, the vehicle sensor 139, and/or the like), and/or the like. In some embodiments, a button or other electrically coupled input device may be disposed within the display device 220 and may be communicatively coupled to the external audio range indication system 100 (FIG. 1) such that when the button or other input device is activated (i.e., touched, moved, etc.), the processor 204 executes logic stored on the memory component 212 to activate the external audio range indication system 100. It should be appreciated that the input device may be a keyboard, a mouse, a joystick, a touch screen, a remote control, a pointing device, a video input device, an audio input device, a haptic feedback device, and/or the like.

The I/O hardware 208 may communicate information between the local interface 202 and one or more other components of the vehicle 110. For example, the I/O hardware 208 may act as an interface between the electronic control unit 200 and other components, such as the global positioning systems (GPS) device 133, other navigation systems, meter units, mobile phone systems, infotainment systems, the display device 220, and/or the like. In some embodiments, the I/O hardware 208 may be utilized to transmit one or more commands to the other components of the vehicle 110.

The network interface hardware 210 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware 210 may provide a communications link between the vehicle 110 and the other components of the external audio range control system 100 depicted in FIG. 1, including (but not limited to) the server computing device 130.

The system interface 214 may generally provide the electronic control unit 200 with an ability to interface with one or more external devices such as, for example, the user-computing device 120 and/or the server-computing device 130 depicted in FIG. 1. Communication with external devices may occur using various communication ports (not shown). An illustrative communication port may be attached to a communications network.

Still referring to FIG. 3A, the display device 220 may be communicatively coupled to the local interface 202 and communicatively coupled to the processor 204 via the local interface 202. The display device 220 may permit information from the local interface 202 to be displayed on a display portion 310 (FIG. 4A) of the display device 220 in audio, visual, graphic, alphanumeric format, and/or the like. The display device 220 may include the digital signal processor 155 (FIG. 2) which may also be communicatively coupled to the local interface 202 and may be communicatively coupled to the processor 204 and/or the memory unit 212 via the local interface 202. Further, the equalizer 160 (FIG. 2) of the audio system 145 (FIG. 2) may be commutatively coupled to the digital signal processor 155 (FIG. 2), to the local interface 202, and/or to the processor 204 via the local interface 202. Moreover, the display device 220 may interface with the input module 206 to include the one or more inputs on the display portion 310 (FIG. 4A) such as the touch screen having a plurality of user controls, as discussed in greater detail herein. Such a display device 220 may be used, for example, to allow the vehicle occupant to interact with the external audio range indication system 100, the sensing system 132, the audio system 145 (FIG. 2), and/or the like.

The sensing system 132 may be communicatively coupled to the local interface 202 and coupled to the processor 204 via the local interface 202. The sensing system 132 may permit data gathered from the at least one sensor 135, the antenna 140, the external microphone 137, the image capturing device 115, the GPS device 133, the vehicle sensor 139, and/or the like to be communicated to the processor 204. The at least one sensor 135 may be configured for light detecting and ranging sensing (LIDAR), a radio detection and ranging sensing (RADAR), a sound navigation and ranging sensing (SONAR), and/or the like. Further, the at least one sensor 135 may be any device, sensor, detector, and/or the like suitable or configured for external sensing to detect objects such as vehicles and/or pedestrians. The antenna 140 may be any device configured to work with global positioning systems (GPS), the GPS device 133, the at least the network interface 210, other navigation systems, and/or the like. As such, the antenna 140 may be suitable for receiving signals, such as GPS signals or signals generated by the server-computing device 130 or the user-computing device 120.

The microphone 137 may be mounted external to the vehicle 110 and may be any device that is suitable for detecting a sound pressure level of the audio content output from the plurality of speakers 150 (FIG. 2). Any suitable commercially available external microphone 137 may be used without departing from the scope of the present disclosure. The image-capturing device 115 may be any device, sensor, or detector that is suitable for obtaining images. As used herein, the term "images" or "image" refers to video images (i.e., a sequence of consecutive images), still images (including still images isolated from video images), and/or image data. Any suitable commercially available image-capturing device 115 may be used without departing from the scope of the present disclosure. The vehicle sensor 139 may be configured to detect a plurality of vehicle conditions. The plurality of vehicle conditions may include detecting when at least one vehicle window is lowered, when a convertible top is open, when a sunroof is open, the current speed of the vehicle 110, and/or the like. In some embodiments, the at least one sensor 135, the antenna 140, the microphone 137, the GPS device 133, the vehicle sensor 139, and/or the image capturing device 115 may be coupled to one or more other components that provide additional functionality, such as, for example, one or more sensors.

Figure 3B:
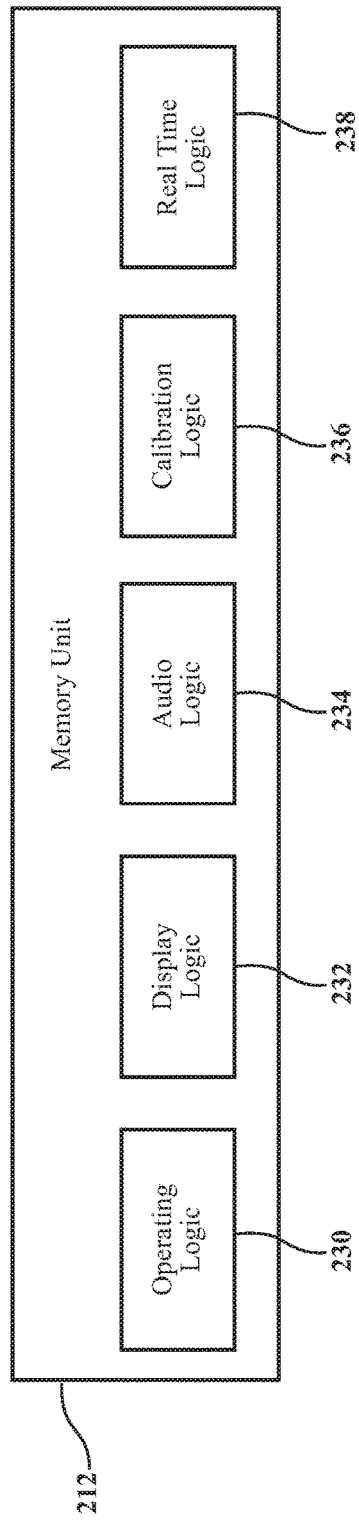
FIG. 3B schematically depicts an illustrative memory component containing illustrative logic components according to one or more embodiments shown and described herein.

With reference to FIG. 3B, in some embodiments, the program instructions contained on the memory unit 212 may be embodied as a plurality of software modules, where each module provides programming instructions for completing one or more tasks. For example, FIG. 3B schematically depicts the memory unit 212 containing illustrative logic components according to one or more embodiments shown and described herein. As shown in FIG. 3B, the memory unit 212 may be configured to store various processing logic, such as, for example, operating logic 230, display logic 232, audio logic 234, calibration logic 236, and/or real time logic 238 (each of which may be embodied as a computer program, firmware, or hardware, as an example). The operating logic 230 may include an operating system and/or other software for managing components of the electronic control unit 200 (FIG. 3A). Further, the operating logic 230 may contain one or more software modules for transmitting data, and/or analyzing data.

Still referring to FIG. 3B, the display logic 232 may contain one or more software modules for collecting data from one or more sources (i.e. settings via the input module 206 from the one or more inputs on the display portion 310*a* depicted in FIG. 3A such as the touch screen, the server-computing device 130 depicted in FIG. 1, and/or the like) and/or converting data into a display, such as a vehicle icon, the external audio range, and/or the like, as described in greater detail herein. Moreover, the display logic 232 may process the data extracted from the audio logic 234 so to change the display portion 310 (FIG. 4A) of the display device 220 in real time, such as the external audio range, as will be discussed in greater detail herein.

The audio logic 234 may contain one or more software modules for determining the external audio range of the audio content output from the plurality of speakers 150 (FIG. 2), where the external audio range being a range from the vehicle at which the audio content output from the plurality of speakers 150 (FIG. 2) is audible by parties external to the vehicle. The audio logic 234 may determine the external audio range based on the audio characteristic of the audio content output from the plurality of speakers 150 (FIG. 2). The audio logic 234 may, based on volume settings (i.e. vehicle occupant set thresholds) of the input module 206 (FIG. 3A), the sensing system 132 (i.e. the GPS device 133 and the preset audio restriction areas), and/or the like, control the audio system 145 (FIG. 2) to vary the audio characteristic of the audio content output from the plurality of speakers 150 (FIG. 2) to vary the external audio range such as reducing or increasing the external audio range, as discussed in greater detail herein. Further, the audio logic 234 may provide data such that the display logic 232 may control the display device 220 (FIG. 3A) to display the external audio range.

It should be appreciated that the audio logic 234 may adjust the external audio range based on a plurality of settings provided by the user-computing device 120 and/or the server-computing device 130, which may be coupled to the memory unit 212 via the computer network 105, such that access to the audio logic 234 may be provided. As an example, an original equipment manufacturer (OEM) may establish initial volume threshold settings for each type of vehicle produced. The OEM may access the audio logic 234 via the processor 204 (FIG. 3A) to communicate, retrieve, upload, download, and/or the like the initial volume threshold settings or a variation thereof to automatically adjust the external audio range. In another non-limiting example, the external audio range may be adjusted based on location of the vehicle and or time of the vehicle use based on audio restriction area information. The audio restriction area information maybe preset by the OEM based on noise ordinances or known locations, but may also be remotely stored by a non-vehicle occupant, as discussed in greater detail herein. A portion or all of the audio logic 234 may reside on different computing devices.

The calibration logic 236 may contain one or more software modules for determining and setting the threshold volume levels based on the initial volume threshold settings created by the OEM and/or the specific threshold level set by the vehicle occupant. The calibration logic 236 may include and/or use a lookup table and/or the like that establishes a correlation between the type of vehicle, the type of audio system, the vehicle occupant specific threshold level, and the external audio range. That is, it should be appreciated that different vehicles with different audio systems may project different audio characteristics such as sound and vibrations. As such, it should be appreciated that the calibration, populating a lookup table, and/or the like, may be predetermined by sound testing the vehicle.

As such, a sound pressure level meter may be used to establish the correlation of the inside volume to the external audio range or a predetermined sound pressure level may be compared to a fixed ambient noise level and distance. The calibration logic 236 would reference this correlation and may make adjustments as needed. Moreover, this correlation method could be used for all vehicle types and audio systems. Further, it is contemplated that the calibration logic 236 may improve the performance of determining the perceivable audio external to the vehicle by using Fast Fournier transforms analysis of the audio to determine a frequency content of the audio being played in the vehicle because different frequencies of sound may emanate from the vehicle at different rates of transfer adjust (i.e. bass heavy content may be perceived easier externally of the vehicle than a mid-range or treble bass). As such, it should be appreciated that the calibration logic 236 may dynamically adjust the audio characteristics of the audio content using the equalizer 160 of the audio system 145, the volume control, and/or the like to vary the external audio range such as reducing the external audio range to a desired threshold. Therefore, the external audio range indication system 100 may display and/or adjust the audio characteristics of the audio content output by the plurality of speakers 150 (FIG. 2).

The real time logic 238 may contain one or more software modules for sensing a sound pressure level, or a perceived external audio volume, by the microphone 137 so to determine and set threshold volume levels. As such, the external microphone 137 may detect the ambient noise emanating from the vehicle 110 and compare the ambient noise to the sound pressure level of the audio content output by the plurality of speakers 150 (FIG. 2). Once the audio content output by the plurality of speakers 150 (FIG. 2) external to the vehicle is known, the lookup table and/or the like that establishes a correlation between the type of vehicle, the type of audio system, the vehicle occupant specific threshold level, and the external audio range may be used to adjust the external audio range similar to the calibration logic 236.

Figure 3C:
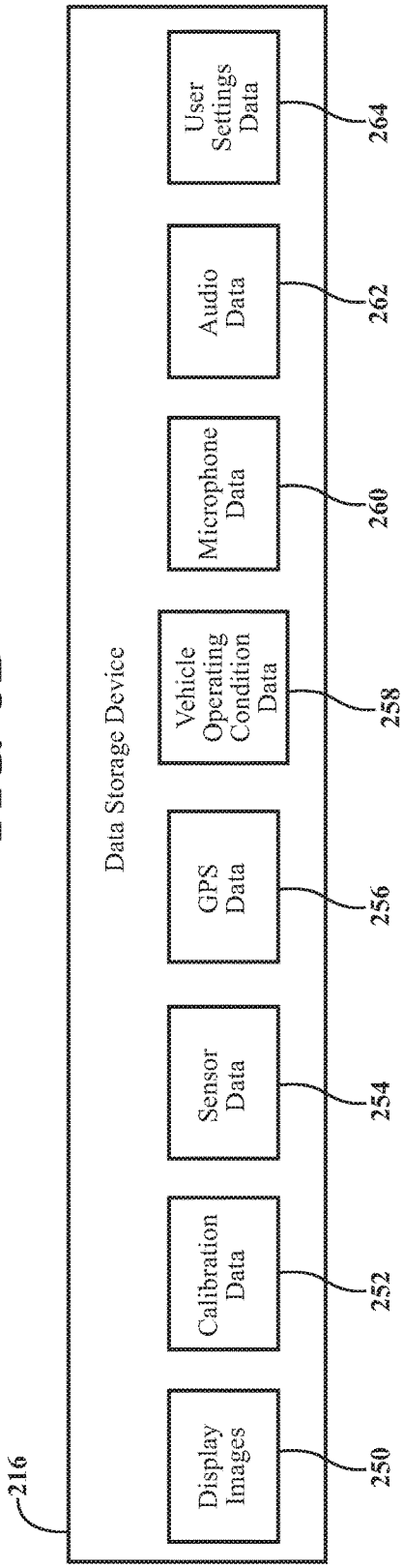
FIG. 3C schematically depicts an illustrative data storage device containing illustrative data components according to one or more embodiments shown and described herein.

FIG. 3C schematically depicts a block diagram of various data contained within a storage device (e.g., the data storage device 216). As shown in FIG. 3C, the data storage device 216 may include, for example, a plurality of display images data 250, such as the vehicle icon 330 (FIG. 4A), a first radial circle 345 (FIG. 4A) that may be the indication of the external audio range, a second and third radial circles 355, 365 (FIGS. 4B and 4C) that may be the indication of a reduced external audio range and/or the like, as discussed herein. The data storage device 216 may further include, for example, a plurality of calibration data 252 such as the lookup table, as discussed in greater detail herein. The data storage device 216 further includes a plurality of sensor data 254, such as data acquired from the sensing system 132. For instance, the plurality of sensor data 254 may include data from the at least one sensor 135 detecting whether or not a second vehicle 350 (FIG. 4B), a pedestrian 360 (FIG. 4C), another object, and/or the like is in the external audio range of the audio content of the audio system 145. The data storage device 216 further includes a GPS data 256, such as data received by the antenna 140 (FIG. 1) and the GPS device 133 to determine the location of the vehicle 110, whether or not the vehicle is in an audio restriction area, such as a school area, a hospital area, a nursing home area, and/or the like, as will be discussed in greater detail herein. The data storage device 216 further includes a vehicle operating condition data 258. The vehicle operating condition data 258 may contain data derived from the vehicle condition sensor 139 of the sensing system 132. The vehicle operating condition data 258 may include data relating to current operating vehicle conditions such as whether or not at least one vehicle window is lowered, a convertible top is open, a sunroof is open, the current speed of the vehicle 110, an engine revolutions per minute, a transmission position, and/or the like. The data storage device 216 further includes a microphone data 260 such as the sound pressure level, the ambient noise external to the vehicle 110, and/or the like.

The data storage device 216 further includes an audio data 262 such as the audio content output from the plurality of speakers 150 (FIG. 2) of the audio system 145 (FIG. 2), the audio characteristic of the audio content output from the plurality of speakers 150 (FIG. 2) of the audio system 145 (FIG. 2), a volume level of the audio content output from the plurality of speakers 150 (FIG. 2) of the audio system 145 (FIG. 2), a frequency content of the audio content output from the plurality of speakers 150 (FIG. 2) of the audio system 145 (FIG. 2), and/or the like.

The data storage device 216 further includes a user setting data 264. The user setting data may include data relating to the audio restriction information for the permitted external audio range, the initial volume threshold settings for audio content output from the plurality of speakers 150 (FIG. 2) of the audio system 145 (FIG. 2), the current volume level of the audio content, a plurality of parental control settings, a preset external audio range, and/or the like. The audio restriction data may include both location and temporal data relating to the vehicle 110 and the external audio range. The location data of the audio restriction information may include stored locations such as a school area, a hospital area, a nursing home area, and/or the like, that when the vehicle 110 is present in these locations, the external audio range is varied, as discussed in greater detail herein. Further, the temporal data may be related to a time of day that the vehicle is operating such that the external audio range may vary based on the time of day the vehicle is in operation. As such, the user settings data 262 may be used in conjunction with other data, such as the GPS data 258, to vary the external audio range, as discussed in greater detail herein. It should be understood that the components illustrated in FIGS. 3A-3C are merely illustrative and are not intended to limit the scope of this disclosure. More specifically, while the components in FIGS. 3A-3C are illustrated as residing within the electronic control unit 200 of the vehicle 110, this is a non-limiting example. In some embodiments, one or more of the components may reside external to the electronic control unit 200 and/or the vehicle 110. Similarly, as previously described herein, while FIGS. 3A-3C are directed to the electronic control unit 200 of the vehicle 110, other components such as the user-computing device 120 and the server-computing device 130 may include similar hardware, software, and/or firmware.

As mentioned above, the various components described with respect to FIGS. 3A-3C may be used to carry out one or more processes and/or produce data that can improve a user interface by displaying a limited set of data related to the external audio range and displays, in real time, the change in the external audio range.

Figure 4A:
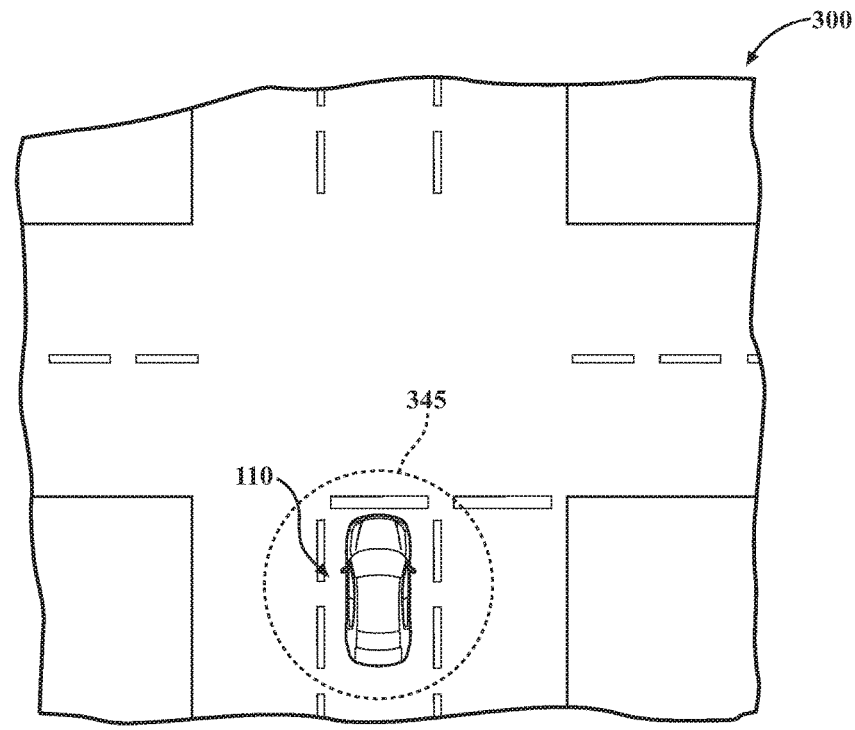
FIG. 4A schematically depicts an example user display when there is not an object detected by the sensor system according to one or more embodiments shown and described herein.
Figure 4A:
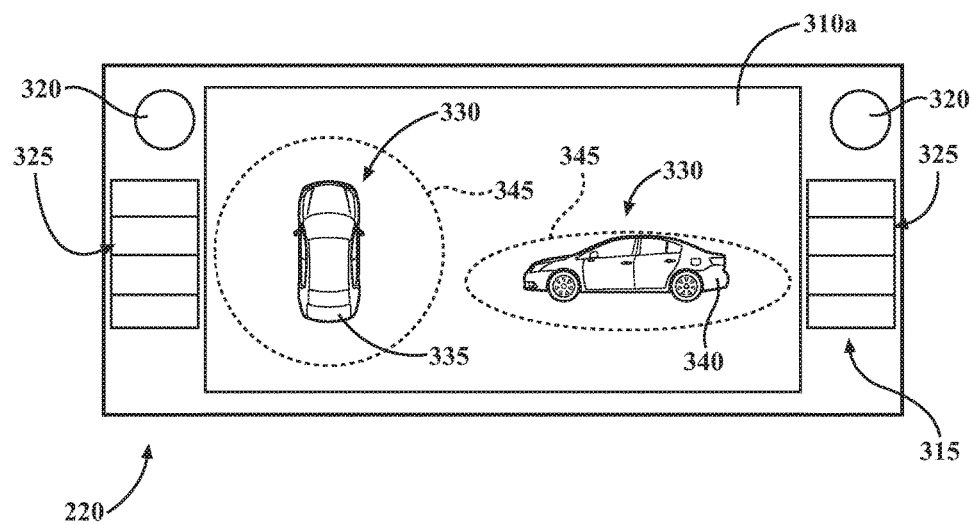
Figure 4B:
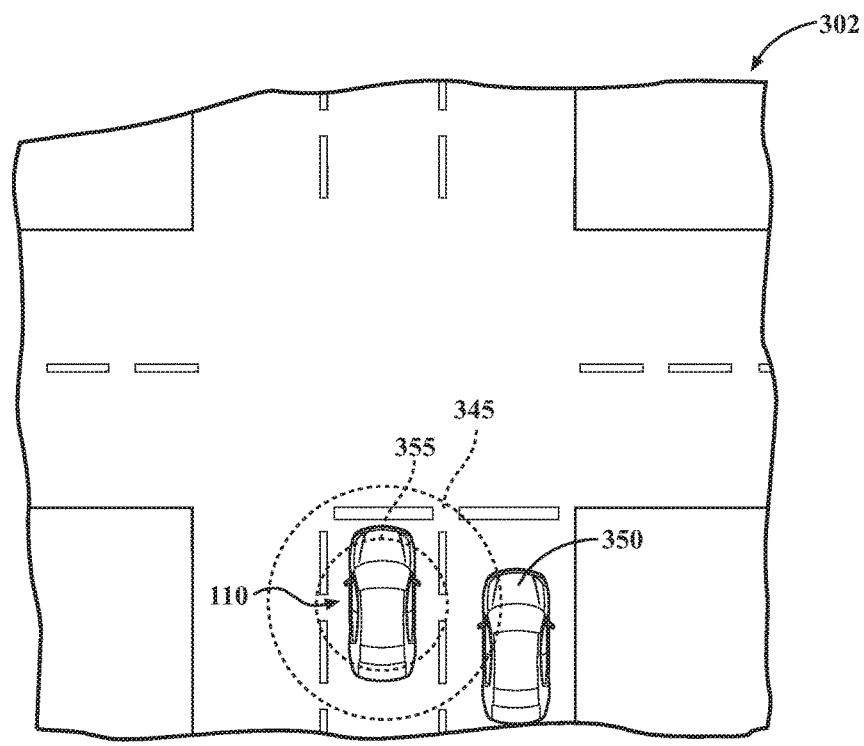
FIG. 4B schematically depicts an example user display when there is a second vehicle detected by the sensor system according to one or more embodiments shown and described herein.
Figure 4B:
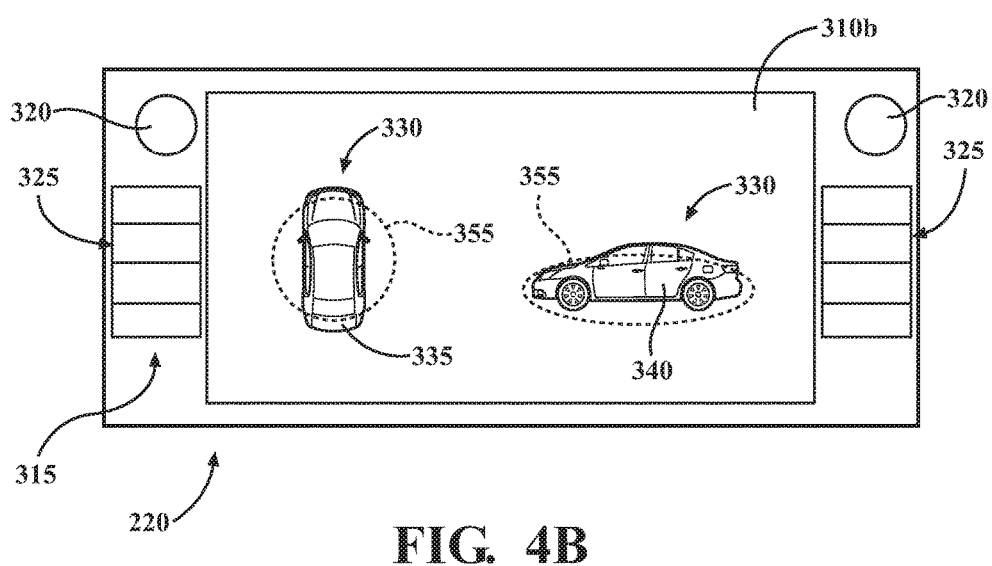
Figure 4C:
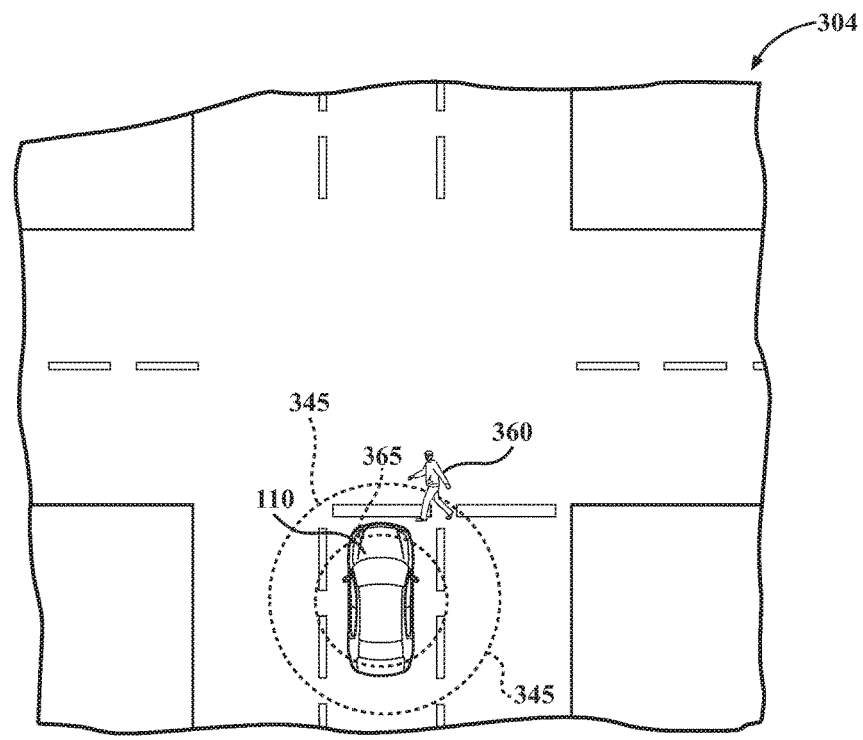
FIG. 4C schematically depicts an example user display when there is a pedestrian detected by the sensor system according to one or more embodiments shown and described herein.
Figure 4C:
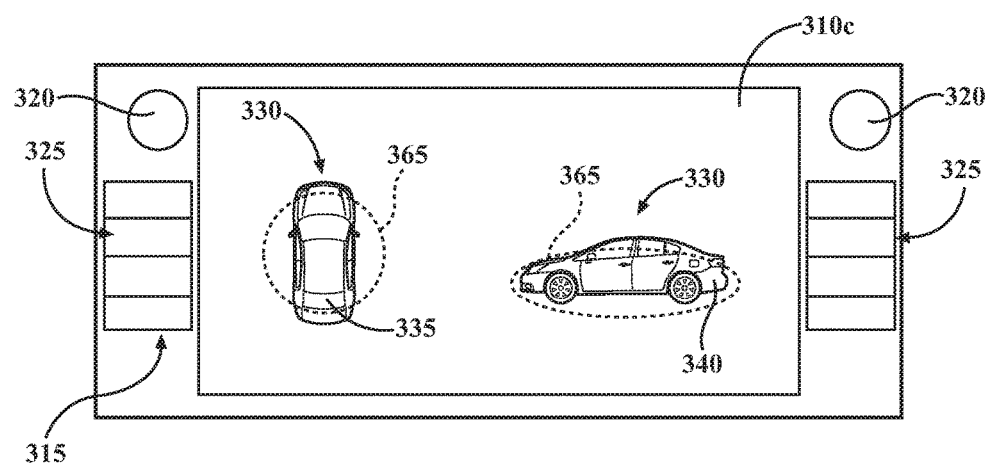

Now referring to FIGS. 4A-4C, the display device 220 and a plurality of example possible road condition overviews 300, 302, 304 are schematically depicted. As discussed above, the display device 220 may include a display portion 310 surrounded by a user input portion 315 communicatively coupled to the input module 206. The user input portion 315 may include a plurality of tactile input hardware (i.e. a knob 320, a plurality of buttons 325, and/or the like) that allows the vehicle occupant to input settings such as the current audio volume and an external audio range threshold. It should be appreciated that the user input portion 315 is illustrated on either side of the display portion 310, but this is non-limiting and the user input portion 315 may be on any side, all sides, and/or any combination thereof. Further, in embodiments, the display portion 310 may be a touchscreen incorporating the user input portion 315 such that user input portion 315 may not include the plurality of tactile input hardware (i.e. the knob 320, the plurality of buttons 325, and/or the like). The display portion 310 depicts a vehicle 330 in a top plan view 335 and an elevational side view 340. The vehicle 330 is a schematic illustration of the vehicle 110.

With respect to FIG. 4A, the vehicle 110 is illustrated on the display portion 310 without an object within the external audio range. As such, the vehicle icon 330 is displayed with the first radial circle 345, indicated by a dotted line extending radially outward from a center point of the vehicle icon 330. It should be appreciated that the first radial circle 345 depicts or is an indication of the external audio range of the audio content output from the plurality of speakers 150 (FIG. 2). As such, the first radial circle 345 extends outwardly, beyond the vehicle icon 330 and symmetrically surrounds the vehicle icon 330. The first radial circle 345 provides a visual indicator to the vehicle occupants of the external audio range of the audio content output from the plurality of speakers 150 (FIG. 2). As such, the first radial circle 345 is displayed on the display device 220 to provide the visual indication of a range from the vehicle 110 at which the audio content output from the plurality of speakers 150 (FIG. 2) is audible by parties external to the vehicle 110. It should be appreciated that the first radial circle 345 may change based on the range of the external audio range. Further, it should be appreciated that the visual indicators may be adjusted by the vehicle occupant or by the initial thresholds to display smaller radius circles that may indicate a lower external audio range threshold, as discussed in further detail herein.

Still referring to FIG. 4A, the display portion 310, as discussed above, corresponds to a first example road condition overview 300 of the vehicle 110. The first example road condition overview 300 includes the vehicle 110 stopped at a four-way intersection and the first radial circle 345 illustrating the external audio range of the audio content output from the plurality of speakers 150 (FIG. 2). As such, the first radial circle 345 indicates the range that the audio content output from the plurality of speakers 150 (FIG. 2) is audible by parties external to the vehicle. In addition, the sensing system 132 of the vehicle 110 is active in order to determine whether another vehicle 350 (FIG. 4B), the pedestrian 360 (FIG. 4C), and/or the like is within a predetermined distance to the vehicle 110. For example, the predetermined distance to the vehicle 10 may be the current external audio range indicated by the first radial circle 345 or a distance preset by the vehicle occupant, a non-vehicle occupant, the OEM, and/or the like. As discussed above, the sensing system 132 uses the at least one sensor 135, the image capturing device 115, the antenna 140, and/or the like to detect, to sense, and/or the like to determine whether the object is within the predetermined perimeter of the vehicle 110.

As illustrated in the first example road condition overview 300, the sensing system 132 does not detect, sense, and/or the like that another vehicle, the pedestrian, and/or the object is present. Thus, the first radial circle 345 would not change. That is, the first radial circle 345 in the display portion 310 and in the first example road condition overview 300 is illustrated as extending beyond the vehicle 110 to indicate that the audio content output from the plurality of speakers 150 (FIG. 2) extends to a range beyond the passenger compartment of the vehicle 110 so to be audible to parties external to the vehicle 110.

Now referring to FIG. 4B, the second example road condition overview 302 of the vehicle 110 corresponds to a second display portion indicator 310b. The second example road condition overview 302 illustrates that the vehicle 110 is stopped at a four way stop and the second vehicle 350 is within the predetermined perimeter, such as within the first radial circle 345. As such, the second vehicle 350 would be within the external audio range. The sensing system 132 of the vehicle 110 would detect, sense, and/or the like that the second vehicle 350 is present and that the second vehicle 350 is within the external audio range. In response to determining that the second vehicle 350 is within the external audio range, the electronic control unit 200 (FIG. 2) controls the audio system 145 (FIG. 2) to vary the audio characteristic of the audio content output from the plurality of speakers 150 (FIG. 2) of the audio system 145 (FIG. 2) to reduce the external audio range. As such, a second radial circle 355 displayed within the second display portion indicator 310b that has a smaller radius surround the vehicle icon 335 with reference to the first radial circle 345.

It should be appreciated that the audio characteristic of the audio content output from the plurality of speakers 150 (FIG. 2) of the audio system 145 (FIG. 2) may be dynamically adjusted by a change in the volume level of the audio content, a change in the frequency content of the audio content, and/or the like. In some embodiments, the change in the volume level of the audio content and/or the change in the frequency content of the audio content may be by the electronic control unit 200 (FIG. 3A), by dynamically adjusting the equalizer 160 (FIG. 2) of the audio system 145 (FIG. 2) and/or a combination thereof.

As such, the second display portion indicator 310b illustrates that the second radial circle 355 is substantially smaller when compared to the first radial circle 345 which may provide a visual indication to the vehicle occupants that the external audio range is reduced. It should also be appreciated that the dynamically adjusting or varying the audio characteristic of the audio content output from the plurality of speakers 150 (FIG. 2) of the audio system 145 (FIG. 2) to reduce the external audio range is completed gradually and over a preset period of time so to reduce any abrupt changes audio content. As such, with each dropped level of the external audio range, the second display portion indicator 310*b* may display the second radial circle 355 radius and/or circumference gradually becoming smaller until the external audio range volume reaches the predetermined threshold level. That is, the second radial circle 355 is a visual indicator on the display portion 310*b* that is displayed in real time.

Now referring to FIG. 4C, the third example road condition overview 304 of the vehicle 110 corresponds to a third display portion indicator 310*c*. The third example road condition overview 304 illustrates that the vehicle 110 is stopped at a four way stop and the pedestrian 360 is within the predetermined perimeter such as within the first radial circle 345. As such, the pedestrian 360 would be within the external audio range. The sensing system 132 of the vehicle 110 is configured to detect, sense, and/or the like that the pedestrian 360 is present and is within the external audio range. In response to determining that the pedestrian 360 is within the external audio range, the electronic control unit 200 (FIG. 2) controls the audio system 145 (FIG. 2) to vary the audio characteristic of the audio content output from the plurality of speakers 150 (FIG. 2) of the audio system 145 (FIG. 2) to reduce the external audio range. As such, a third radial circle 365 displayed within the third display portion indicator 310*c* has a smaller radius surrounding the vehicle icon 335 with reference to the first radial circle 345. In some embodiments, the third radial circle 365 displayed within the third display portion indicator 310*c* has a smaller radius surrounding the vehicle icon 335 with reference to the second radial circle 355 (FIG. 4B), has a different color, or alerts the driver that the object within the external audio range is a pedestrian.

It should be appreciated that the audio characteristic of the audio content output from the plurality of speakers 150 (FIG. 2) of the audio system 145 (FIG. 2) may be dynamically adjusted by a change in the volume level of the audio content, a change in the frequency content of the audio content, a change in treble, base, and/or the like. In some embodiments, the change in the volume level of the audio content and/or the change in the frequency content of the audio content may be by the electronic control unit 200 (FIG. 3A), by dynamically adjusting the equalizer 160 (FIG. 2) of the audio system 145 (FIG. 2) and/or a combination thereof.

As such, the third display portion indicator 310*c* illustrates that the third radial circle 365 is substantially smaller when compared to the first radial circle 345, which may provide a visual indication to the vehicle occupants that the external audio range is reduced. It should also be appreciated that the dynamically adjusting or varying the audio characteristic of the audio content output from the plurality of speakers 150 (FIG. 2) of the audio system 145 (FIG. 2) to reduce the external audio range is completed gradually and over a preset period of time so to reduce any abrupt changes audio content. As such, with each dropped level of the external audio range, the second display portion indicator 310*c* may display the third radial circle 365 radius and/or circumference gradually becoming smaller until the external audio range volume reaches the predetermined threshold level. That is, the third radial circle 365 is a visual indicator on the display portion 310 that is displayed in real time.

Further, it should be appreciated that the second radial circle 355 (FIG. 3B) and the third radial circle 365 may have different radius, have different circumferences, be a different color, and/or the like to indicate to the vehicle occupants that the pedestrian 360, the second vehicle 350 (FIG. 3B), and/or the like was detected.

Further yet, it should be appreciated that the sensing system 132 does not necessarily need to detect the second vehicle 350 (FIG. 4B), the pedestrian 360 (FIG. 4D), or another object for the audio characteristic of the audio content output from the plurality of speakers 150 (FIG. 2) of the audio system 145 (FIG. 2) to be dynamically adjusted by the change in the volume level of the audio content, the change in the frequency content of the audio content, and/or the like. In embodiments, the electronic control unit 200 (FIG. 2) monitors the location of the vehicle 110 using the GPS device 133 (FIG. 1), navigation systems, and/or the like to determine whether or not the vehicle 110 is in the audio restriction area, such as the school area, the hospital area, the nursing home area, and/or the like. In response to determining that the area that the vehicle 100 is located includes the audio restriction information, the electronic unit 200 varies the audio characteristic of the audio content output from the plurality of speakers 150 (FIG. 2) of the audio system 145 (FIG. 2) to reduce the external audio range based on the audio restriction information of the area that the vehicle 110 is located. It should be appreciated that the areas of the audio restriction information may be preset areas based on the type of area (i.e. school zone, residential area, and/or the like), preset based on a noise ordinance (i.e. nursing home area), and/or a temporal condition such as an audio restriction based on time of day (i.e. whether the time of day is 2:00 pm or 2:00 am).

In some embodiments, it should be appreciated that the audio restriction information may be set by a parental restriction. As such, the display device 220 (FIG. 2A) and/or the network interface 210 (FIG. 2A) may permit for a vehicle occupant or a non-vehicle occupant to either preset or real-time set the audio restriction information. As such, the non-occupant, such as a parent, may geotag certain areas, or when there are more than 2 occupants in the vehicle 110 (i.e. when the driver has friends in the vehicle) such that it is desirable by the non-occupant to vary the audio characteristic of the audio content output from the plurality of speakers 150 (FIG. 2) of the audio system 145 (FIG. 2) to reduce the external audio range based on the audio restriction information of the area that the vehicle is located.

In one embodiment, the electronic control unit 200 (FIG. 3A) is configured to determine whether the speed of the vehicle 110 detected by the vehicle sensor 139 is equal to or less than a predetermined threshold. The predetermined threshold may be preset by the vehicle occupant, the OEM, and/or the like. As such, the predetermined threshold is generally a speed at which the audio content output by the plurality of speakers 150 (FIG. 2) can be heard by parties external to the vehicle 110. By way of example and non-limiting, the predetermined threshold may be less than 25, 15, 10, 5, or 0 miles per hour. In response to determining that the speed of the vehicle 110 detected by the vehicle speed sensor 139 is equal to or less than the predetermined threshold, the electronic control unit 200 (FIG. 3A) may vary the audio characteristic of the audio content output from the plurality of speakers 150 (FIG. 2) of the audio system 145 (FIG. 2) to reduce the external audio range. Further, the display device 220 displays the reduced external audio range.

Figure 5:
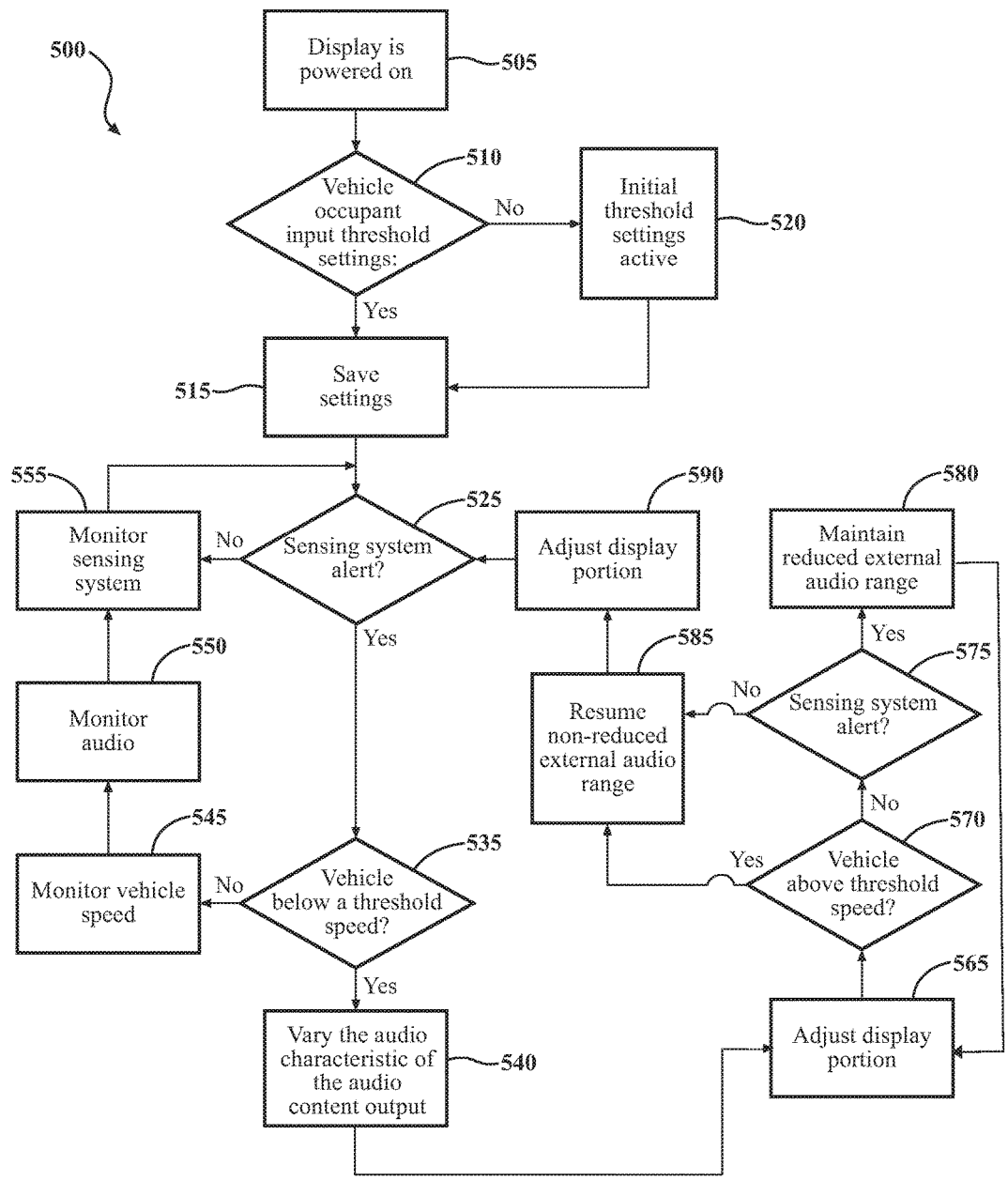
FIG. 5 depicts a flow diagram of an illustrative method of determining whether to reduce the external audio range according to one or more embodiments shown and described herein.

Now referring back to FIGS. 1-3A and also now to FIG. 5, a flow diagram of an illustrative method 500 of determining whether to vary the audio characteristic of the audio content output from the plurality of speakers 150 of the audio system 145 to reduce the external audio range reduce the external audio range is depicted. An input is received, by the processor 204, that the display device 220 is active at block 505. With the display device 220 active, the vehicle occupant or non-occupant may elect to input a plurality of threshold settings for specific conditions such as the audio restriction information at block 510. The threshold settings are saved at block 515. If the vehicle occupant elects not to change any of the threshold settings at block 510, the initial threshold settings or last saved threshold settings are active at block 520 and these settings are saved at block 515.

With the threshold settings saved, the external audio range indication system 100 (FIG. 1) determines whether the sensing system 132 is alerted to an object such as the second vehicle 350 (FIG. 4B) or the pedestrian 360 (FIG. 4C) is detected, sensed, and/or the like within the external audio range or that the vehicle is within the preset location using the GPS device 133 (FIG. 1), at block 525. If the sensing system 132 (FIG. 2) alerts at block 525, the external audio range indication system 100 determines whether the vehicle 110 has a speed below a threshold speed at block 535. Example threshold speeds may be a stopped condition or a slow speed consistent with speeds found in traffic jams. If the vehicle speed is below the threshold at block 535, then the external audio range indication system 100 varies the audio characteristic of the audio content output from the plurality of speakers 155 of the audio system 145 to reduce the external audio range the external audio range at block 540.

On the other hand, if the sensing system 132 (FIG. 1) does not alert at block 525, the external audio range indication system 100 may continuously monitor for an alert from the sensing system 132 at block 555. Further, if the vehicle speed is above the threshold at block 535, then the external audio range indication system 100 may continuously monitor the vehicle speed at block 545 and the alert from the sensing system 132 at block 555.

Once the audio characteristic of the audio content output from the plurality of speakers 155 of the audio system 145 to reduce the external audio range is varied at block 540, the display device 220, and in particular, the first radial circle 345 (FIG. 4A) is adjusted to match the external audio range at block 565 such as the second or third radial circles 355, 365 (FIGS. 4B-4C). During the varying or after the varying of the external audio range, the external audio range indication system 100 monitors for the vehicle 110 to exceed the threshold speed at block 570. Further, during the varying or after the varying of the external audio range, the system 100 also monitors if the sensing system 132 is still alerting at block 575. If the vehicle speed remains below the speed threshold at block 570 and the sensing system 132 (FIG. 1) remains alerted at block 575, the external audio range will remain at the reduced level at block 580. On the other hand, if the vehicle speed is above the threshold value at block 570 or the sensing system 132 is no longer alerted at block 575, then the external audio range may be returned to the non-reduced levels. It should be appreciated that the external audio range indication system 100 may vary the audio characteristic of the audio content output from the plurality of speakers 155 of the audio system 145 to return the range of the external audio range to the level it was previous to the reduction at block 540. Further, the display device 220 is adjusted to match the external audio range at block 590. That is, the second or third radial circles 355, 365 expand back to the circumference and radius of the first radial circle 345. The external audio range control system 100 may then continuously loop by determining whether the sensing system 132 is alerted at block 525.

It should now be understood that the methods, systems, and vehicle components described herein may function to reduce an external audio range based on varying an audio characteristic of an audio content output from a plurality of speakers of an audio system. A display device may display the current external audio range in real time to the vehicle occupants. Moreover, a plurality of vehicle operating conditions may determine whether to vary the audio characteristic of the audio content output from the plurality of speakers of the audio system. The plurality of vehicle operating conditions may include the current vehicle speed, whether another vehicle, pedestrian, and/or the like is within the external audio range, the vehicles location, parental controls, and/or the like.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It is claimed:

1. An external audio range indication system for a vehicle, the vehicle including a passenger compartment, the system comprising:
   an audio system that includes a plurality of speakers within the passenger compartment, the plurality of speakers configured to output an audio content;
   a display device; and
   an electronic control unit operatively connected to the audio system and the display device, the electronic control unit including a processor and a memory unit coupled to the processor, the memory unit stores logic that, when executed by the processor, causes the electronic control unit to:
   determine an external audio range of the audio content output from the plurality of speakers, the external audio range being a range from the vehicle at which the audio content output from the plurality of speakers is audible by parties external to the vehicle; and
   control the display device to display the external audio range.

2. The external audio range indication system of claim 1, wherein the electronic control unit determines the external audio range based on an audio characteristic of the audio content output from the plurality of speakers of the audio system.

3. The external audio range indication system of claim 2, wherein the audio characteristic of the audio content includes a volume level of the audio content output from the plurality of speakers of the audio system.

4. The external audio range indication system of claim 2, wherein the audio characteristic of the audio content includes a frequency content of the audio content output from the plurality of speakers of the audio system.

5. The external audio range indication system of claim 2, wherein the display device displays a vehicle icon, and wherein the electronic control unit controls the display device to display the external audio range with respect to the vehicle icon.

6. The external audio range indication system of claim 5 further comprising:
an object detection sensor that detects an object located externally to the vehicle, the object detection sensor operatively connected to the electronic control unit,
wherein the electronic control unit is configured to:
determine whether the object detected by the object detection sensor is within the external audio range,
in response to determining that the object is within the external audio range, control the audio system, vary the audio characteristic of the audio content output from the plurality of speakers of the audio system to reduce the external audio range, and
control the display device to display the reduced external audio range.

7. The external audio range indication system of claim 6, wherein the electronic control unit is configured to, in response to determining that the object is within the external audio range, vary the audio characteristic of the audio content output from the plurality of speakers of the audio system to reduce the external audio range to a preset external audio range,
wherein the preset external audio range is a range which is less than a distance between the vehicle and the object detected by the object detection sensor.

8. The external audio range indication system of claim 6 further comprising a vehicle speed sensor configured to detect a speed of the vehicle, the vehicle speed sensor operatively connected to the electronic control unit,
wherein the electronic control unit is configured to:
determine whether the speed of the vehicle detected by the vehicle speed sensor is equal to or less than a predetermined threshold,
in response to determining that the speed of the vehicle detected by the vehicle speed sensor is equal to or less than the predetermined threshold, vary the audio characteristic of the audio content output from the plurality of speakers of the audio system to reduce the external audio range, and
control the display device to display the reduced external audio range.

9. The external audio range indication system of claim 5 further comprising:
a global positioning system operatively connected to the electronic control unit,
wherein the electronic control unit is configured to:
determine an area that the vehicle is located based on an output from the global positioning system,
determine whether the area that the vehicle is located includes an audio restriction information based on pre-stored location information stored in the memory unit,
in response to determining that the area that the vehicle is located includes the audio restriction information, vary the audio characteristic of the audio content output from the plurality of speakers of the audio system to reduce the external audio range based on the audio restriction information of the area that the vehicle is located, and control the display device to display the reduced external audio range.

10. The external audio range indication system of claim 1 further comprising a microphone provided on an exterior of the vehicle, the microphone configured to detect a sound pressure level of the audio content from the plurality of speakers of the audio system, the microphone operatively connected to the electronic control unit,
wherein the electronic control unit is configured to determine the external audio range based on the sound pressure level detected by the microphone.

11. A method of displaying an external audio range indication for a vehicle, the vehicle including a passenger compartment, the method comprising the steps of:
outputting, from an audio system having a plurality of speakers disposed in the passenger compartment, an audio content;
determining, by an electronic control unit, an external audio range of the audio content output from the plurality of speakers, the external audio range being a range from the vehicle at which the audio content output from the plurality of speakers is audible by parties external to the vehicle; and
displaying, by a display device, the external audio range indication for the vehicle.

12. The method of claim 11, wherein the electronic control unit determines the external audio range based on an audio characteristic of the audio content output from the plurality of speakers of the audio system.

13. The method of claim 12, wherein the audio characteristic of the audio content includes a volume level of the audio content output from the plurality of speakers of the audio system.

14. The method of claim 12, wherein the audio characteristic of the audio content includes a frequency content of the audio content output from the plurality of speakers of the audio system.

15. The method of claim 12, wherein the display device displays a vehicle icon, and wherein the electronic control unit controls the display device to display the external audio range indication with respect to the vehicle icon.

16. The method of claim 15, further comprising the steps of:
detecting, by an object detection sensor, an object external to the vehicle;
determining, by the electronic control unit, whether the object external to the vehicle is within the external audio range;
controlling, by the electronic control unit, the audio system to vary the audio characteristic of the audio content output from the plurality of speakers of the audio system to reduce the external audio range; and
controlling, by the electronic control unit, the external audio range indication displayed on the display device.

17. The method of claim 16, wherein controlling, by the electronic control unit, the audio system to vary the audio characteristic of the audio content output from the plurality of speakers of the audio system to reduce the external audio range to a preset external audio range,
wherein the preset external audio range is a range which is less than a distance between the vehicle and the object detected by the object detection sensor.

18. The method of claim 16, further comprising the steps of:
detecting, by a vehicle speed sensor, a speed of the vehicle;
determining, by the electronic control unit, whether the speed of the vehicle detected by the vehicle speed sensor is equal to or less than a predetermined threshold;
controlling, by the electronic control unit, the audio system to vary the audio characteristic of the audio content output from the plurality of speakers of the audio system to reduce the external audio range when the speed of the vehicle detected is equal to or less than the predetermined threshold; and controlling, by the electronic control unit, the external audio range indication displayed on the display device to display the reduced external audio range.

19. The method of claim 15, further comprising the steps of:

detecting, by a global positioning system, a vehicle location;

determining, by the electronic control unit, whether the vehicle location includes an audio restriction information based on pre-stored information;

controlling, by the electronic control unit, the audio system to vary the audio characteristic of the audio content output from the plurality of speakers of the audio system to reduce the external audio range based on the audio restriction information for the vehicle location; and controlling, by the electronic control unit, the external audio range indication displayed on the display device to display the reduced external audio range.

20. The method of claim 11, further comprising the steps of:

detecting, by a microphone provided on an exterior of the vehicle, a sound pressure level of the audio content from the plurality of speakers of the audio system; and determining, by the electronic control unit, the external audio range based on the sound pressure level detected by the microphone.

* * * * *